United States Patent
King

[15] 3,693,431
[45] Sept. 26, 1972

[54] GEAR TOOTH DEFLECTION MEASURING MACHINE

[72] Inventor: Dean D. King, Princeville, Ill.

[73] Assignee: Westinghouse Air Brake Company, Pittsburgh, Pa.

[22] Filed: Aug. 26, 1971

[21] Appl. No.: 175,241

[52] U.S. Cl. ................................................. 73/162
[51] Int. Cl. .......................................... G01m 13/02
[58] Field of Search ..73/162, 99, 136 R; 33/179.5 R, 33/179.5 A, 179.5 B, 179.5 C, 179.5 D, 179.5 E

[56] References Cited

UNITED STATES PATENTS 2,957,343 10/1960 Hornbostel ............. 73/136 R

*Primary Examiner*—Louis R. Prince
*Assistant Examiner*—Denis E. Corr
*Attorney*—Robert J. Eck

[57] ABSTRACT

A gear tooth deflection measuring machine adapted to measure both the deflection of a single tooth under loaded and unloaded conditions and to measure the total deflection of the particular gear teeth in engagement during rotative mesh and in loaded condition; said machine being based upon the closed loop or four-square theory incorporating a pair of spaced-apart parallel shaft assemblies, each of which are operatively engaged at their lower end portion to a gear box unit for effecting independent rotation of same and at their upper end portion to a gear and ring assembly, including a test gear, a measuring ring and a load ring. The test gears are disposed in meshing engagement and the measuring and load rings are interconnected by a relatively thin band of linear stretch material, such as beta titanium or beryllium bronze; the load band being utilized for applying a predetermined load or torque on one of said shaft assemblies through operation of one of said gear box units, and the measuring band for recording the total deflection of the engaged gear teeth when run through operative mesh under the said predetermined load upon operation of the other gear box unit; said total deflection being determined by the elongation or reduction in length of the measuring band.

21 Claims, 6 Drawing Figures

FIG. 1
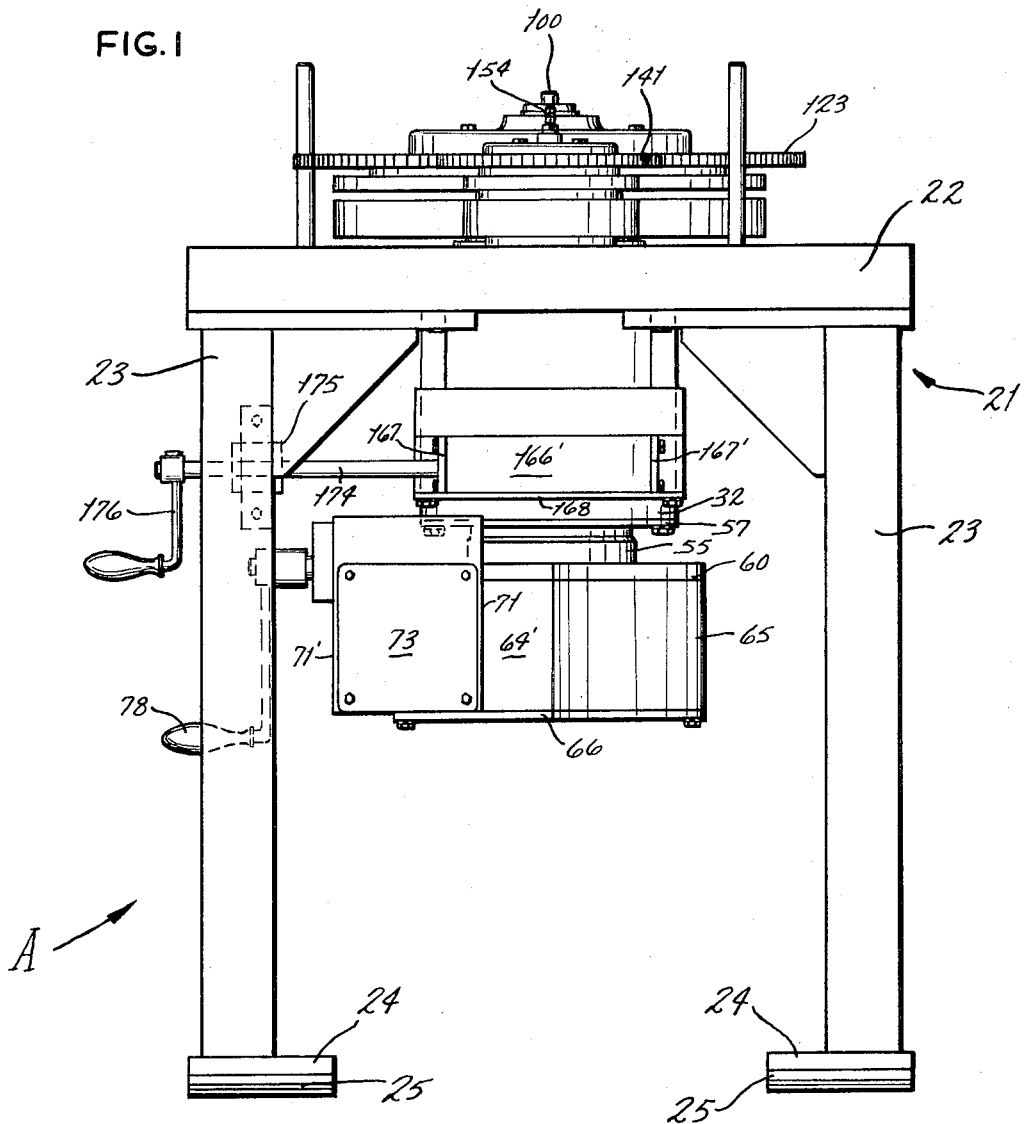
INVENTOR
DEAN D. KING
ATTORNEY

INVENTOR
DEAN D. KING
BY *Robert J. Eck*
ATTORNEY

GEAR TOOTH DEFLECTION MEASURING MACHINE

BACKGROUND AND SUMMARY OF THE INVENTION

The present invention relates in general to gear testing machines, and more particularly, to a machine for measuring the gear tooth deflection of a pair of test gears being subjected to a predetermined applied load and moved in angular meshing rotation simulative of an actual powered operation.

Heretofore, the gear measuring machines of the prior art could only measure teeth deflection of gears indirectly. For example, some machines measured teeth deflection when test gears were in rotative mesh but with no load applied thereto; while other machines measured teeth deflection when the test gears were under an applied load but not in rotative mesh. Other prior art machines measured the change of the center distance between a pair of meshing gears but did not measure the tooth deflection as such. Still other machines utilized a master gear in meshing engagement with a test gear for comparing results. Therefore, all the prior art machines have been unsatisfactory because a gear or gears could not be satisfactorily and completely tested in the shop or laboratory prior to being incorporated within the equipment for which it was designed. Accordingly, if the gear or gear subsequently failed or did not meet the design requirements after installation in the equipment, costly replacement or inefficient operation had to be accepted.

The importance of recording tooth deflection measurements of gears cannot be overemphasied. Gears develop inaccuracies in tooth deflections due to many variable factors, such as heat treatment distortion, machine shop errors, poor design, or the like. As these tooth deflection inaccuracies pass through mesh under loaded condition the errors result in excess deflection which lead to tooth impact, tooth fatigue, material surface breakdown and the like and, therefore, such deflections need to be known. The prior art machines were incapable of measuring the summation of the teeth deflection while revolving through mesh under a predetermined control load. If such measurements could be obtained prior to the installation within the working equipment, the quality level of the gears as thus evaluated could be enhanced. Moreover, with such knowledge of the deflection measurements, the development of new gear designs could be readily achieved as the optimization of pitch, tooth depth, pressure angle, tooth addendum proportions as well as many other factors, could be determined for accommodating the best fit between gear sets depending upon the particular job to be accomplished by said gears. Additionally, with such measurements being a reality, the operating characteristics of the meshing gears could be evaluated for determining causes for noise, tooth pitting, scoring, scuffing, lubricating film development or the like.

The problem of measuring the teeth deflection of meshing gears under the loaded condition is increased since the number of teeth in contact vary from a minimum of two to a maximum of four at progressive points along the line of action as the rotative mesh occurs. Therefore, the teeth deflection may vary at any one point on any one tooth according to the numbers of teeth sharing the load and the angular meshing position of the two gears. Thus, since the load sharing condition and meshing position of the gear teeth are constantly variable throughout a completed loaded and meshing cycle, the determination of the teeth deflection are exceedingly complex, and are further complicated as the teeth deflection have a time function as well.

By the present invention, the performance of meshing gears under a predetermined load and in angular meshing relationship can be readily determined prior to the incorporation within the equipment for which they are designed. The instant machine is based upon the closed loop or four-square theory incorporating a pair of spaced-apart parallel shaft assemblies which are capable of being rotated through independent gear trains and are operatively engaged by gear and ring assemblies including test gear, a measuring ring and a load ring. The test gears are disposed in meshing relationship and the measuring and load rings are interconnected by relatively thin bands of linear stretch material, such as beta titanium or beryllium bronze, with the load band being utilized for the application of a predetermined load or torque on one of the shaft assemblies and the measuring band for recording the total deflection of the engaged gear teeth when run through mesh under the said load, as determined by the elongation or reduction of the measuring band.

BRIEF DESCRIPTION OF THE DRAWINGS

FIG. 1 is a side elevational view of a gear teeth deflection measuring machine constructed in accordance with and embodying the present invention.

DESCRIPTION OF THE PREFERRED EMBODIMENT

Figure 2:
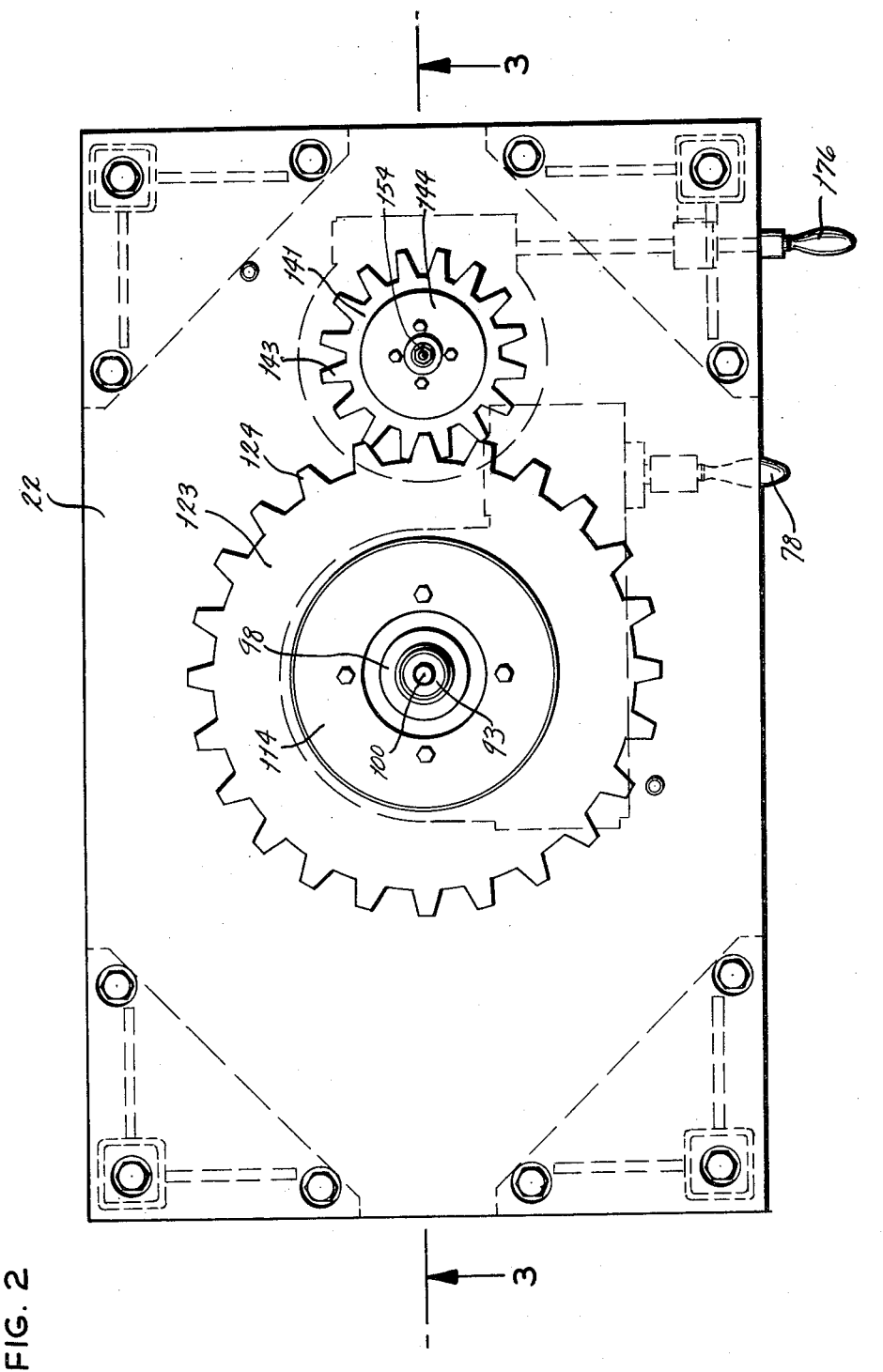
FIG. 2 is a top plan view of said machine.

Referring now by reference characters to the drawings wherein like reference characters designate like corresponding parts, there is shown in FIG. 1 a gear teeth deflection measuring machine A comprising a table 21 having a top plate 22 which is supported above ground by a plurality of legs 23; each of which is fixed to a base plate 24, which in turn is supported by a plurality of absorbent pads, collectively designated 25, which absorb the energy entering machine A during operation for reducing the floor vibrations thereof.

Figure 3:
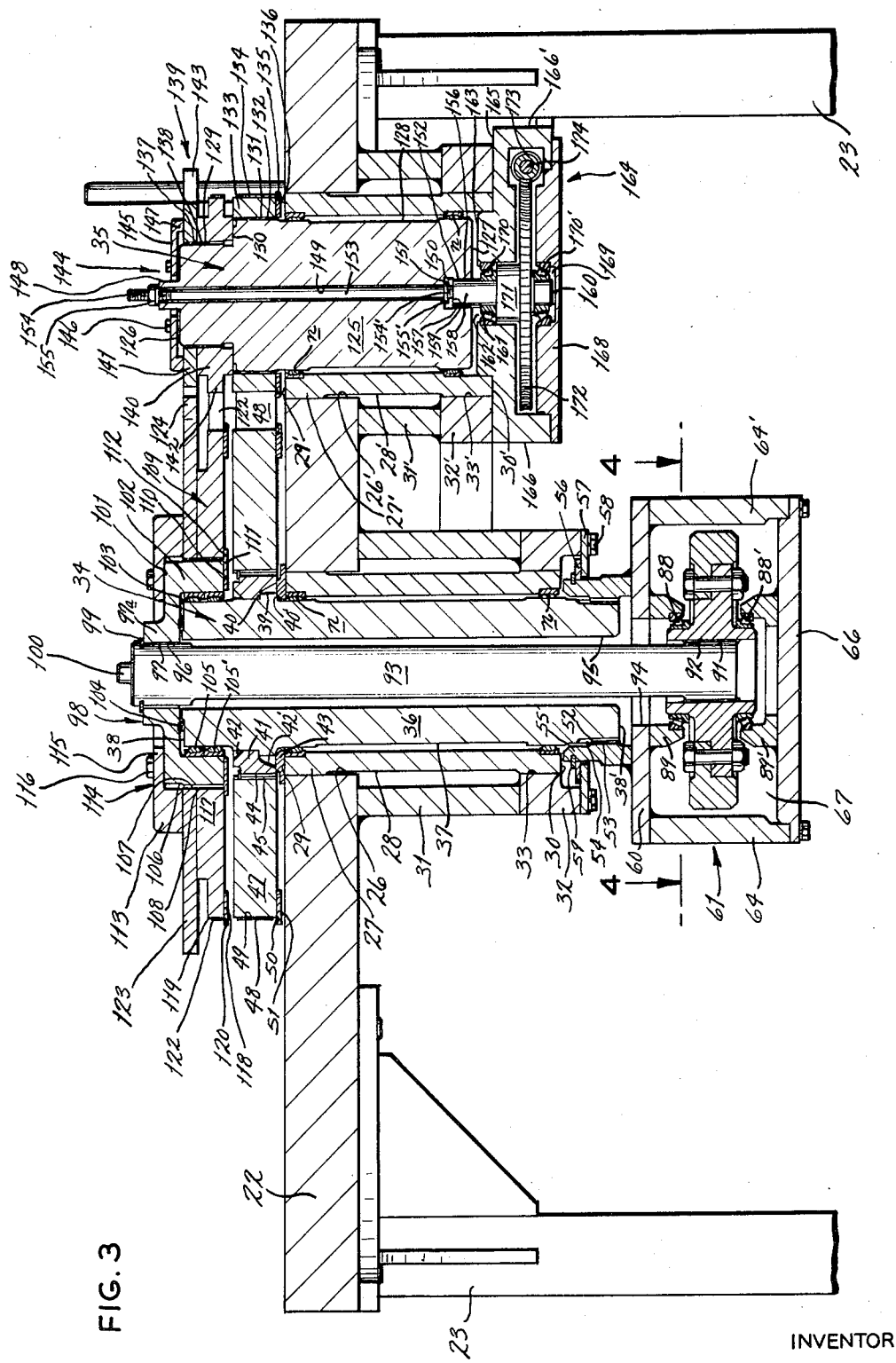
FIG. 3 is a vertical transverse section taken substantially on the line 3—3 of FIG. 2.
Figure 5:
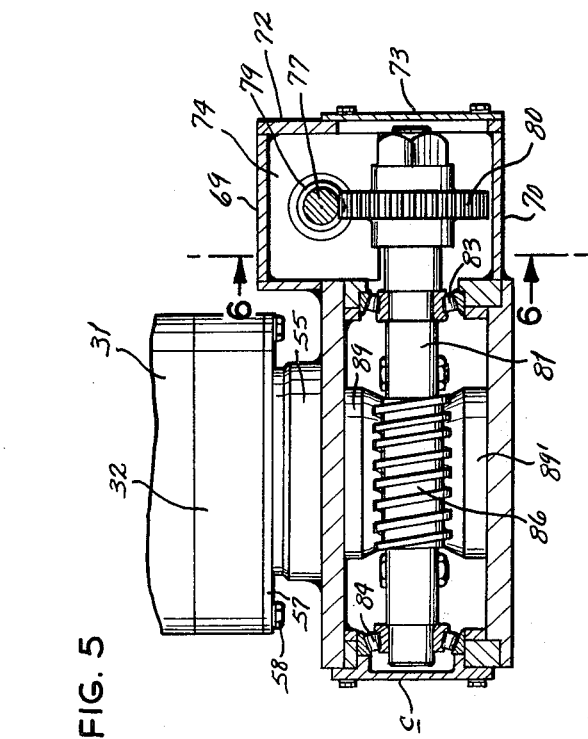
FIG. 5 is a vertical transverse section taken on the line 5—5 of FIG. 4.

Referring to FIG. 3, it will be observed that top plate 22 is provided with a pair of axially parallel, spaced-apart bores 26,26', each of which receive the upper end portion of a cylindrical bushing 27,27' each having a side wall 28,28', an upper end wall 29,29' and lower end wall 30,30', respectively; each upper end wall 29,29' being positioned surfacewise flush with the upper face of top plate 22. Surroundingly of each bushing 27,27', in the region below table 21, there is provided a cylindrical casing 31,31', respectively, the upper of each being fixed, as by welding, to the underface of top plate 22 and the lower end of each being secured to a ring 32,32', respectively, having an inner peripheral wall 33,33', respectively, fixed to the bushing side wall 28,28' immediately adjacent the lower end wall 30,30'.

Received for rotative movement within each bushing 27,27' are shaft assemblies 34,35, respectively, there being needle bearings *n* provided in each bushing 27,27' adjacent the respective upper and lower end walls 29,30 and 29,30', respectively, for facilitating the rotative movement of shaft assemblies 34,35.

Shaft assembly 34 comprises a cylindrical sleeve 36 having a side wall 37 and upper and lower end walls 38,38'. Spacedly downwardly of the upper end wall 38, said side wall 37 is integrally formed with a peripheral bead 39 which cooperates with side wall 37 to define upper and lower shoulders 40,40', respectively. Received over sleeve 36 is a mounting ring 41 having an inner diameter substantially the same as the outer diameter of the sleeve side wall 37 so that the lower face of mounting ring 41 engages the upper shoulder 40 of bead 39. Formed within mounting ring 41 immediately adjacent its inner periphery, there is an upper and a lower wedge-shaped groove 42,42'; within which is received a suitable welding material for fixing said mounting ring 41 to the sleeve side wall 37 and to the bead 39. The lower face of mounting ring 41 and lower shoulder 40' engage the upper face of a thrust bearing ring 43 which is located concentrically of opening 26 being in engagement with the upper face of the top plate 22 and the upper end wall 29 of bushing 27.

Said mounting ring 41 is integrally formed in its outer peripheral wall with a plurality of splines 44 adapted for interlocking engagement with complementary splines 45 formed within the inner peripheral wall 46 of an input load ring 47. As will be further noted hereinbelow, the input load ring 47 is formed with slots (not shown) for receiving the end portion of a relatively thin load band 48, preferably fabricated from beta titanium material, which load band 48 snugly engages the outer peripheral wall 49 of load ring 47. The lower edge of said load band 48 is received within an annular groove 50 formed within a retainer disc 51 mounted to the underface of load ring 47 thereby maintaining said load band 48 in circumferential relationship with the outer peripheral wall 49.

Immediately adjacent the lower end wall 38' of sleeve 36 the side wall 37 is formed with a plurality of splines 52 which are interlockingly received within complementary splines 53 formed within the inner wall 54 of a collar 55. Received over the upper end portion of collar 55 is a mounting ring 56 which engages on its lower face the upper face of a bearing ring 57 which latter is suitably mounted as by bolts 58 to the ring 32 of casing 31. Said mounting ring 56 is retained in engagement with bearing ring 57 by means of a snap ring 59 in a well-known manner. Thus, it will be observed that collar 55 is rotatably supported on bearing ring 57 and is adapted to rotate along with sleeve 36 through the interlocked splines 52 and 53.

Figure 4:
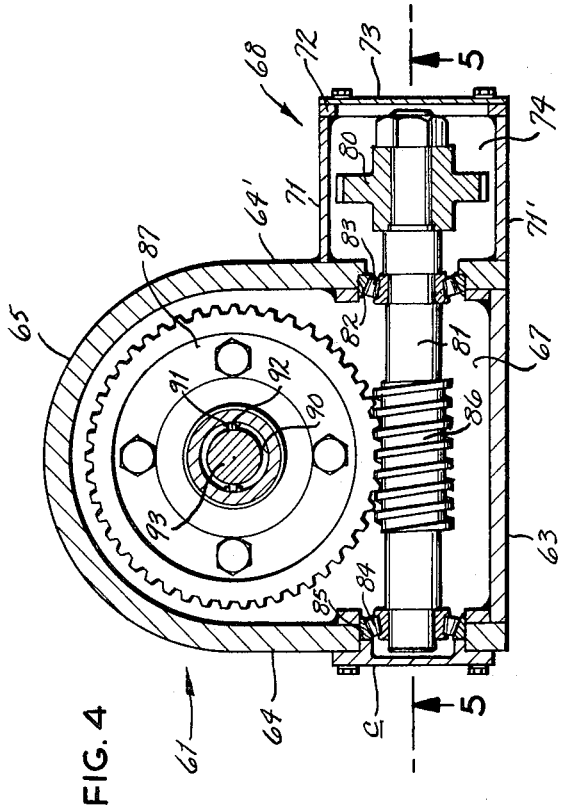
FIG. 4 is a horizontal transverse section taken on the line 4—4 of FIG. 3 illustrating the gear box housing and the gear train therein.
Figure 6:
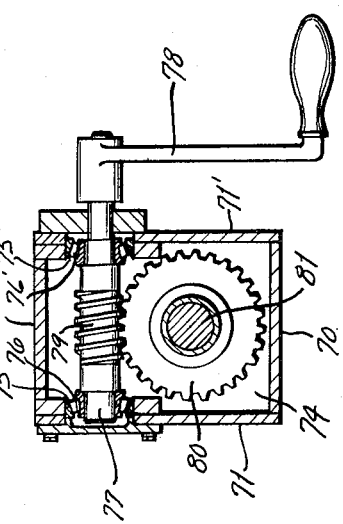
FIG. 6 is a vertical section taken on the line 6—6 of FIG. 5.

The lower end portion of the collar 55 is fixed to the top wall 60 of a gear box housing 61, as best observed in FIGS. 3 and 4, also having a flat end wall 63, a pair of side walls 64,64', which merge into an arcuate end wall 65, and a removable bottom wall or plate 66; said housing walls cooperating to define a compartment 67. Fixed to the side wall 64' of gear box housing 61 in the region adjacent flat end wall 63 is an auxiliary gear box housing 68 having a top wall 69 (FIG. 6), bottom wall 70, a pair of end walls 71,71' and a side wall 72 having a removable plate 73 for providing access to a chamber 74 defined by the said walls. Spacedly downwardly from top wall 69 (FIG. 6) there is provided openings 75,75' in end walls 71,71' for receiving tapered roller bearings 76,76' to accommodate a shaft 77, one end of which projects outwardly of end wall 71' for connection to a hand crank 78 for effecting rotation thereof. Shaft 77 is provided with a worm 79 which meshes with a worm gear 80 fixed on one end portion of a shaft 81. The shaft 81 projects through an opening 82 in the side wall 64' of gear box housing 61, within which is provided a tapered roller bearing 83 for supporting said shaft 81 for rotation. The other end portion of shaft 81 is journaled within a tapered roller bearing 84 provided within an opening 85 within side wall 64, which opening 85 is closed by a cover plate *c* mounted on side wall 64. Shaft 81 carries a worm 86 for meshing engagement with a worm gear 87, which is rotatable within upper and lower tapered roller bearings 88,88' received within inwardly projecting collars 89,89', respectively, being suitably mounted on the inner faces of top wall 60 and bottom wall 66, respectively (FIG. 3).

Said worm gear 87 is provided with a central bore 90 incorporating splines 91 for interlocking engagement with splines 92 integrally formed on the lower end portion of an input shaft 93 which projects upwardly through an opening 94 in housing top wall 60 and into a bore 95 formed within said sleeve 36; the outer diameter of input shaft 93 being less than the diameter of bore 95 so that input shaft 93 may rotate independently of sleeve 36. The upper portion of shaft 93 is formed with splines 96 for interlocking engagement with corresponding splines 97 of the collar 97a of an input hub 98; there being a snap ring 99 fixed within the input shaft 93 for abutment against the upper face of the input hub 98. For purposes to be described hereinbelow the upper extremity of input shaft 93 is integrally formed with a lug 100.

Said input hub 98 comprises a flat plate portion 101, which projects radially outwardly from the collar 97a, and a depending skirt 102 extending around the outer periphery of plate 101. The inner walls of the plate 101 and the skirt 102 cooperate to define a central recess 103 for receiving the upper end portion of sleeve 36; there being a thrust bearing 104 interposed between said plate 101 and the sleeve upper end wall 38, and a pair of needle bearings 105,105' between the sleeve side wall 37 and the inner face of the skirt 102. Thus, it will be observed that said input hub 98 is rotatably supported by bearings 104,105 and 105' on the upper end portion of sleeve 36 so that input shaft 93 may rotate independently of sleeve 36, as will be seen.

The skirt 102 of input hub 98 is provided in its outer peripheral wall 106 with a plurality of circumferentially spaced-apart splines 107 which are adapted to receive complementary splines 108 of a gear and ring assembly, collectively designated 109. Fixed to the bottom wall 110 of skirt 102 is a support ring 111 which projects spacedly radially outwardly of outer wall 106 for defining a seat 112 upon which said gear and ring assembly 109 abuts. Engaging the upper portion of gear and ring assembly 109 is the circumferential leg 113 of a retainer member 114 having an inwardly projecting flange 115 which engages the upper face of the flat plate 101 of input hub 98 and is secured thereto as by bolts 116. Thus, by retainer member 114, the gear and hub assembly 109 is fixed to the input hub 98 for rotational movement along with input shaft 93.

Said gear and ring assembly 109 comprises a measuring ring 117 having a retainer disc 118 fixed on its underface, said retainer disc 118 having an outwardly projecting portion 120, extending radially outwardly of outer wall 119, within which portion 120 is provided a circumferential groove for receiving the lower edge of a measuring band 122, preferably formed of beta titanium as will be described. Said measuring band 122 is adapted to snugly engage said outer peripheral wall 119 through the employment of a conventional adjustment device (not shown) which supplies an initial tention to the measuring band 122 and assures flush engagement thereof with the peripheral outer wall 119. Engaging the upper face of measuring ring 117 there is a test gear 123, which is formed on a predetermined proportional radius as measuring ring 117 having a plurality of teeth 124 in its outer peripheral wall.

Having fully described the structure of shaft assembly 34, the shaft assembly 35 will now be described. Shaft assembly 35 generally comprises a drum 125 having a top wall 126, a bottom wall 127 and intervening side wall 128; the latter having a diametrically reduced portion 129 adjacent the upper end wall 126 for developing a seat 130. Immediately downwardly of said seat 130, the side wall 128 is provided with a plurality of circumferential splines 131 for receiving complementary splines 132 of a load ring 133 having an outer peripheral wall 134 about which said load band 48 wrapped. The lower edge of said load band 48 is received within an annular groove 135 formed within a retainer disc 136, of the same construction as retainer disc 51, being mounted to the underface of load ring 133 for maintaining the load band 48 in circumferential relationship with the outer peripheral wall 134. The load band 48 crosses over center between the load rings 47 and 133 so that the same will rotate in opposite directions for purposes to be later described.

The diametrically reduced portion 129 is also provided with a plurality of circumferential splines 137 for receiving complementary splines 138 of a gear and ring assembly 139 comprising a measuring ring 140 having its lower face abutting against seat 130 and a test gear 141 engaging the upper face of measuring ring 140; said measuring ring 140 and test gear 141 being formed on a predetermined propertional radius, as will be described.

Formed integral with measuring ring 140 is a radially projecting bead 142 about which said measuring band 122 is wrapped. The test gear 141 is provided in its outer wall with a plurality of teeth 143 which are adapted to mesh with the teeth 124 of test gear 123.

The gear and ring assembly 139 is locked in position on the diametrically reduced portion 129 by a retainer member 144 comprising a flat plate 145, which is secured, as by bolts 146, to the top wall 126 of drum 125, and a depending skirt 147 which engages the upper face of test gear 143. Thus, it will be observed that the gear and ring assembly 139 and the load ring 133 are mounted on the drum 125 for rotation therewith.

Integrally formed with top wall 126 there is an axially projecting boss 148 having a relatively thin diametrical bore 149 provided therein, which bore 149 extends axially through drum 125 and opens into a counterbore 150 provided in bottom wall 127 for developing a shoulder 151 and a side wall 152. Received within bore 149 is an adjustment rod 153 having opposed threaded end portions 154,154' projecting axially outwardly of boss 148 and shoulder 151. The threaded end portions 154,154' are adapted to accommodate lock nuts 155,155', respectively, for abutment against the upper face of boss 148 and the shoulder 151, respectively, to maintain rod 153 in a predetermined position.

Side wall 152 of counterbore 150 is formed with a plurality of circumferential splines 156 which interlockingly engage corresponding splines 157 of a stub shaft 158 having a top wall 159, a bottom wall 160 and an intervening side wall 161. Provided within top wall 159 is a tapped opening (not shown) for threadedly receiving the lower threaded end portion 154' of adjustment rod 153 for establishing engagement therebetween.

Stub shaft 158 projects downwardly through an aperture 162 in the top wall 163 of a gear box housing 164; said top wall 163 having an annular recess portion 165 suitably fixed to the lower end faces of bushing 27' and mounting ring 32'. Said gear box housing 163 is also provided with side walls 166,166', end walls 167,167' (FIG. 1) and a removable bottom wall 168. Said bottom wall 168 is formed with an inwardly opening aperture 169 disposed in registering relationship with the aperture 162 of top wall 163; said apertures 162 and 169 being adapted for accommodating upper and lower tapered roller bearings 170,170' within which stub shaft 158 is journaled for rotation.

Provided surroundingly of stub shaft of 158 between tapered roller bearings 170,170' is the collar 171 of a worm gear 172; said collar 171 being interlocked with stub shaft 158, as by splines (not shown). Said worm gear 172 is adapted to mesh with a worm 173 formed on a shaft 174 which is suitably journaled for rotation within bearings (not shown) provided in gear box housing 164. Said shaft 174 projects outwardly endwise through end wall 167 (FIG. 1) where the same is received within a pillow block 175 mounted on table leg 23; there being a hand crank 176 fixed on the outer end portion of shaft 174 for facilitating rotation of same. Thus, when hand crank 176 is rotated, the worm 173 on shaft 174 effects rotation of worm gear 172 thereby revolving stub shaft 158 and drum 125.

It will be observed that the vertical position of drum 125 may be adjusted by rotating adjustment rod 153 so that the plane of rotation of the gear and ring assembly 139 and load ring 133 is the same as that of the gear and ring assembly 109 and load ring 47. It is imperative for achieving accurate measurements that the plane of rotation of the gear and ring assembly 139 be in the same plane of rotation as that of the gear and ring assembly 109.

MEASURING AND LOAD BANDS

Referring to the gear and ring assemblies 109 and 131, (FIG. 3) it will be observed that the measuring rings 117 and 140 are in fixed relationship with the associated test gears 123 and 141, respectively. As mentioned hereinabove, the measuring rings 117 and 140 are formed on a predetermined proportional radius as that of the related test gears 123 and 141. The outer diameter of the measuring rings 117 and 140 are machined to a closely controlled tolerance so that the measuring rings 117 and 140 are of substantially the same diameter as the diameter from which the conjugate tooth surfaces are generated on the respective test gears 123 and 141, with appropriate allowance being made for the band thickness. Thus, the measuring rings 117 and 140 are manufactured to substantially the same base circle diameter from which the conjugate tooth form of the test gears is generated. The base circle diameter of each measuring ring 117,140 is proportioned from the particular pressure angle of the gear teeth and the pitch diameter of the associated test gears 123,141, respectively. The pitch diameter and the base circle diameter are mathematically calculated as follows:

Pitch diameter = No. of gear teeth/Diametrical pitch
Base circle diameter = (pitch diameter) (cosine of pressure angle)

For example, if a test gear had the following characteristics:

No. of gear teeth = 40
Diametrical pitch = 4
Pressure angle = 25°
Pitch diameter = 40/4 = 10 inches
Base circle diameter = (10 inches) (cosine 25° = 9.063

The measuring band 122 is of relatively small cross section being preferably 0.010 inch in thickness and 0.5 inch in width, and is wrapped around the outer peripheral walls 119 and 142 of the measuring discs 117 and 140, respectively. The band 122 is then initially stretched through the adjusting mechanism (not shown) to sufficiently allow variations in the band tension to occur without complete loss of tension. Through the initial tension of said band 122, it may be lengthwise reduced as well as elongated.

The band is preferably constructed from beta titanium which has a relatively low modulus of elasticity being approximately 16 million having a yield in the range of 170–175 KSI so that it has a potential for stretching in the range of 0.008–0.010 per inch of band length. Therefore, if the distance between the measuring rings 117 and 140 is 5 inches, the total allowable elongation would be (5) (0.010) or 0.050 inches.

The beta titanium material is extremely resilient exhibiting a linear stretch capability, so long as the band 122 is not stretched beyond its elasticity point. Since the teeth deflection of test gears 123,141 are usually relatively small, being in the range of 0.001–0.003 for each tooth, the total deflection of the test gears can be measured through the stretch of the measuring band 122 to as much as 0.030 or 0.040. The beta titanium measuring band 122 will last for the life of the machine A, as it is corrosion proof and extremely resilient.

The load band 48 is also fabricated from beta titanium but preferably of a cross section approximately 0.02 inch in thickness and 1.5 inch in width. In situations where the load may be extended to the operation range, a thickness of 0.04 inch may be utilized effectively.

Another material that may be effectively used for the load band 48 and the measuring band 122 is beryllium bronze, which has a lower modulus of elasticity than beta titanium but does not exhibit as much allowable stress or yield. The yield of beryllium bronze is approximately two-thirds that of beta titanium. Therefore, beryllium bronze is not recommended as a measuring band 122 for testing the gear deflection between steel gears, although it may be effectively utilized on gears made of aluminum or plastic. The modulus of elasticity for beryllium bronze is approximately 12 million.

OPERATION

The underlying theory of gear teeth deflection measuring machine A is the closed loop or the four-square arrangement, as known in the art, wherein two gear sets are operatively engaged and locked together after applying a twisting couple to one of the connecting shafts of the gear sets. Since torque is proportional to twist, the twisting of one of the shaft assemblies such as 34', developes a torque load so that upon being locked in with the other shaft assembly, such as 35, the twist or torque remains constant as the gear system rotates whereby full torque can be applied thereto during operation.

With gear and ring assemblies 109 and 139 being mounted in position on the respective shaft assemblies 34 and 35, so that the gear teeth 124 and 143 of test gears 123 and 141, respectively, are in meshing engagement, the respective measuring band 122 and the load band 148 are tightened so that all slack is absorbed. At this juncture, the adjustment screw 153 of shaft assembly 35 may be turned for assuring that the gear assemblies 109 and 139 are in the same plane of rotation, as above described.

PRELOADING STAGE

With both gear assemblies 109 and 139 in position on the shaft assemblies 34 and 35, respectively, the operator grasps the hand crank 78 of said auxiliary gear box housing 68 and rotates same for turning the shaft 77 and the worm 79 which latter meshes with the worm gear 80 for turning the shaft 81. The rotation of the latter shaft 81 effects the meshing engagement between the worm 86 and the worm gear 87 which in turn, through the splined connection 91,92, effects the rotation of the input shaft 93, along with the input hub 98 and the gear and ring assembly 109. Because of the interengagement between said gear assemblies 109 and 139, the shaft assembly 34 will rotate for effecting, through load band 48, the rotation of load ring 47 in an opposite direction to input shaft 93. Since the load ring 47 is fixed to the sleeve 36, which in turn is connected to gear box housing 61, the sleeve 36 and the gear box housing 61 will rotate in an opposite direction to the input shaft 93. By means of a suitable instrument (not shown) attached to lug 100 of input shaft 93, the latter is prohibited from rotating so that the gear box housing and sleeve 36 turns while the operator turns the crank 78 for storing energy within input shaft 93. The turning of the gear box housing 61 generally creates no problem as usually a few turns of crank 78 is all that is required to tortionally wind up the input shaft 93. Under usual conditions, the gear box housing 61 only rotates in the range of 10–15°. The torque stored within input shaft 93 may be conveniently measured by a conventional strain gauge (not shown) by applying same to the input shaft 93 in the usual manner.

It will be observed that since the measuring rings 117 and 140 are made to a predetermined proportional diameter as the test gears 123 and 141, respectively, the plane of the measuring band 122, when wrapped around measuring rings 117 and 140, will lie exactly in the plane of the line of action between the engaged gear teeth 124 and 143 of the test gears 123 and 141, respectively. As will be seen, any errors in the gear teeth deflection of test gears 123 and 141 will develop a change in rotation between the upper portions of input shaft 93 and the sleeve 36. The relative motion between the input shaft 93 and the sleeve 36 is a function of the gear teeth deflection errors. Accordingly, by turning hand crank 78 by the above procedure, the test gears 123 and 141 may be preloaded for storing torque within input shaft 93. Since the input shaft 93 and the gear box housing 61 are interconnected by the gear train comprising worm gear 87, worm 86, worm gear 80 and worm 79, the torque in the total system is balanced to zero. With continual turning hand wheel 78, increased loading on the gear teeth 124 and 143 and increased tension in the load band 48 will occur.

LOADING STAGE

With the gear and ring assemblies 109 and 139 being preloaded to the desired torque level, the operator grasps the hand crank 176 for effecting rotation of the shaft 174, which in turn through the intermeshment of worm 173 and the stub shaft 158 and the drum 125 of said shaft assembly 35 rotates with a consequent rotation of load ring 133 and ring and gear assembly 139. Thus, the turning of hand crank 175 effects the rotation of the gear 141 for running same through mesh with the test gear 123.

The previously described closed loop system in the preloaded stage has induced tooth loads on the test gears 123 and 141, tension in the load band 48, as well as torsion within the input shaft 93, all of which are in static equilibrium. Accordingly, turning one gear, such as 141, relative to the other gear 123, is possible by a secondary system; i.e., the gear train comprising worm gear 172 and worm 173, because the measuring band 122, which is wrapped around the measuring rings 117 and 140, enables equal shaft angular rotation with the gear teeth 124 and 143. In other words, the portion of measuring band 122 on measuring ring 140 wraps upon the other measuring ring 117 at the same proportional rate as test gear 141 operates upon the other test gear 123. Thus, the rotational ratio between test gears 123 and 141 is reproduced by the ratio of the measuring rings 117 and 140 so that the entire closed-loop system can be rotated without loss of internal torque stored within the shaft assembly 34. The test gears 123, 141 may be run through as many tooth meshes as desired within the limitation established by the length of the particular measuring band 122. Moreover, by utilizing the secondary rotating system by rotating hand crank 176, the angular position of test gear 141 is defined relative to a measuring device, such as an angular transducer (not shown) may be electronically recorded in parallel with all deflection recordings. By these readings the teeth deflection of the test gears 141 and 123 may be computed as it is a function of the position of the gear teeth 143 and 124, respectively.

As described hereinabove, the measuring rings 117 and 140 are formed on substantially the same diameter from which the conjugate tooth form of the gears 123 and 141 are generated. Thus, the measuring band 122 lies in the same plane as the line of action between the engaged gear teeth 124 and 143. When the gears 123, 141 are rotated through several tooth meshes, the measuring band 122 unwraps from one measuring ring, such as 140, and wraps upon the other measuring ring, such as 117. As the measuring band 122 follows the conjugate action of the gear teeth 124, 143, there is no change in the degree of stretch in the measuring band 122 unless the aggregate summation of all the engaged gear teeth deflection changes or errors in conjugate action occurs from other sources, such as bad teeth spacing, errors in tooth form, etc. By measuring the amount of stretch of measuring band 122, the total summation of the gears' teeth deflection can be determined. Friction effects may be cancelled by rotating the hand crank 176 in one direction and then reversingly in the other.

The change in the length of the measuring band 122 is measured by the application of strain gauges or other elongation measuring devices thereto in a conventional manner. Because of the usage of beta titanium material for measuring band 122, high sensitivity may be obtained; said beta titanium band being capable of stretching to 170,000 psi. Experiments have shown that sensitivities to 0.00005 per inch were obtained with a 90 percent certainty that repetitive measurements would fall within 0.0002 inch total variation. Thus, extreme accuracy can be realized by the gear deflection measuring machine A of the present invention.

In addition to the measurements described hereinabove other measurements of the test gears under loaded and unloaded conditions may be determined. Additional deflection measurements of the test gears may be measured by dimensionally comparing a single gear tooth of one gear under no load conditions and then comparing the same gear tooth under load conditions as the gear teeth roll through mesh. This may be accomplished by a dial indicator device (not shown) which is mounted on the top face of the test gear in the region of the particular tooth for recording the amount of bend in the tooth as it revolves through mesh. Accordingly, the dial indicator device (not shown) may be utilized separately to measure and record single tooth deflection simultaneously with the composite, aggregative deflection of the gear teeth in engagement as determined by the measuring band 122.

Therefore, by the gear teeth deflection measuring machine A of the present invention, accurate measurements of gear teeth deflection may be readily and easily determined while a pair of gears are being turned through rotative mesh under a loaded condition. Therefore, gears may be completely and satisfactorily tested in the shop or laboratory prior to being incorporated within the equipment for which it was designed.

Having thus described my invention what I claim and desire to obtain by Letters Patent is:

1. A machine for measuring the teeth deflection between a pair of meshing gears comprising:
    first shaft means carrying one of said gears for rotation therewith;
    second shaft means carrying the other of said gears for rotation therewith;
    means for supporting said first and second shaft means in axially parallel, spaced-apart relationship with said gears being in meshing engagement;
    means operatively engaged to one of said shaft means for developing a predetermined torque load thereon to subject said gears to a preloaded condition;
    drive means operatively engaged to the other of said shaft means for turning said gears through rotative mesh while under said preloaded condition; and
    deflection measuring means interconnecting said gears for recording the engaged teeth deflection thereof.

2. A machine as defined in claim 1 and further characterized by:
    a ring member concentrically associated with each of said gears for rotation therewith, each ring member having an outer wall formed substantially on the same radius as the base circle of the related gear;
    said deflection measuring means being carried by said ring members.

3. The machine as defined in claim 2 and further characterized by:
    said deflection measuring means including a band of linear stretch material having end portions;
    one end portion of said band being trained around one of said ring members;
    the other end portion of said band being trained around the other of said ring members;
    said band exhibiting a stretch during operation of said drive means which is proportional to the deflection of the engaged gear teeth during rotative mesh and under a preloaded condition.

4. The machine as defined in claim 3 and further characterized by:
    said band being fabricated from beta titanium.

5. The machine as defined in claim 3 and further characterized by:
    said band being fabricated from beryllium bronze.

6. The machine as defined in claim 1 and further characterized by:
    one of said shaft means comprising a first rotative member and a second rotative member;
    said first rotative member carrying one gear and said deflection measuring means;
    means interconnecting said second rotative member with said other shaft means to effect rotation in opposite directions.

7. The machine as defined in claim 6 and further characterized by:
    said means for developing a predetermined torque including a gear train;
    means defining a housing for said gear train;
    said gear train being operatively engaged to said first rotative member;
    means operatively engaging said housing to said second rotative member for interlocking said first and second rotative members.

8. The machine as defined in claim 6 and further characterized by:
    said means interconnecting said second rotative member with the other of said shafts means comprising:
    a load ring fixed on each of said second rotative member and the other of said shaft means;
    a band having end portions;
    one end portion of said band being trained around the load ring of said second rotative member;
    the other end portion of said band being trained around the load ring on the other of said shaft means;
    said band crossing over center for effecting rotation of said load rings in opposite directions.

9. The machine as defined in claim 8 and further characterized by:
    said band comprising beta titanium.

10. The machine as defined in claim 8 and further characterized by:
    said band comprising beryllium bronze.

11. A machine for measuring teeth deflection between first and second meshing gears comprising:
    primary shaft means including a first rotatable member and a second rotatable member;
    said first gear being fixed on said first rotatable member for rotation therewith;
    secondary shaft means carrying said second gear;
    means supporting said primary and said secondary shaft means in axially parallel, spaced-apart relationship with said first and second gears being in meshing engagement;
    means operatively engaging said secondary shaft means and said second rotatable member for effecting rotation thereof in opposite directions;
    a ring member carried by each of said first and said second gears, each ring member being in planar aligned relationship and formed on substantially the same diameter as the base circle of the associated gears;
    deflection measuring means interconnecting the ring members of said first and second gears;
    first drive means operatively connected to said first rotatable member for developing a torque load therein to subject said first and second gears to a preloaded condition;
    means connecting said second rotatable member and said first drive means for locking said first rotatable member in said preloaded condition;
    second drive means operatively engaged to said secondary shaft means for rotating same independently of said primary shaft means, said second drive means operating to rotate said first and second gears through mesh and to rotate the associated ring members of each first and second gear for recording on said deflection measuring means the teeth deflection of the engaged teeth of said first and second gears.

12. The machine as defined in claim 11 and further characterized by:
    said deflection measuring means comprising a relatively thin band of material having linear stretch characteristics, said band having end portions;

means on said ring members for receiving the opposed end portions of said band for training same therearound.

13. The machine as defined in claim 12 and further characterized by:
said band being fabricated of beta titanium.

14. The machine as defined in claim 12 and further characterized by:
said band being fabricated of beryllium bronze.

15. A machine as defined in claim 11 and further characterized by:
adjustment means associated with said secondary shaft means for moving same axially to assure that the second gear and the related ring member of said secondary shaft means are in the same plane of rotation as the first gear and the related ring member of said primary shaft means.

16. The machine as defined in claim 11 and further characterized by:
a measuring device mounted on said secondary shaft means for recording the position of said second gear to determine the relative position of the gear teeth.

17. The machine as defined in claim 16 and further characterized by:
said measuring device comprising an angular transducer.

18. The machine as defined in claim 11 and further characterized by:
a measuring device mountable on said first rotatable member of said primary shaft means for determining the torque load stored therein during the operation of said first drive means.

19. The machine as defined in claim 11 and further characterized by:
a measuring device mountable on said first gear for determining the deflection of a single tooth on said first gear through mesh with said second gear while under said preloaded condition.

20. The machine as defined in claim 11 and further characterized by:
said means operatively engaging said secondary shaft and said second rotatable member comprising a load ring fixed on each of said second rotative member and said secondary shaft means;
a band having end portions, one end portion of said band being trained around the load ring of said second rotatable member, the other end portion of said band being trained around the load ring of said secondary shaft means;
said band crossing over center for effecting rotation of said load rings in opposite directions.

21. The machine as defined in claim 11 and further characterized by:
said first drive means comprising a gear train operatively connected to said first rotatable member;
a housing for said gear train;
means operatively connecting said gear train housing to said second rotatable member;
said gear train and said gear train housing cooperating to develop a torque load on said first rotatable member and to lock same in said preloaded condition.

* * * * *